May 3, 1966 W. KASTEN 3,249,229
FUEL STORAGE AND DISPENSING SYSTEM
Filed Oct. 23, 1963 4 Sheets-Sheet 1
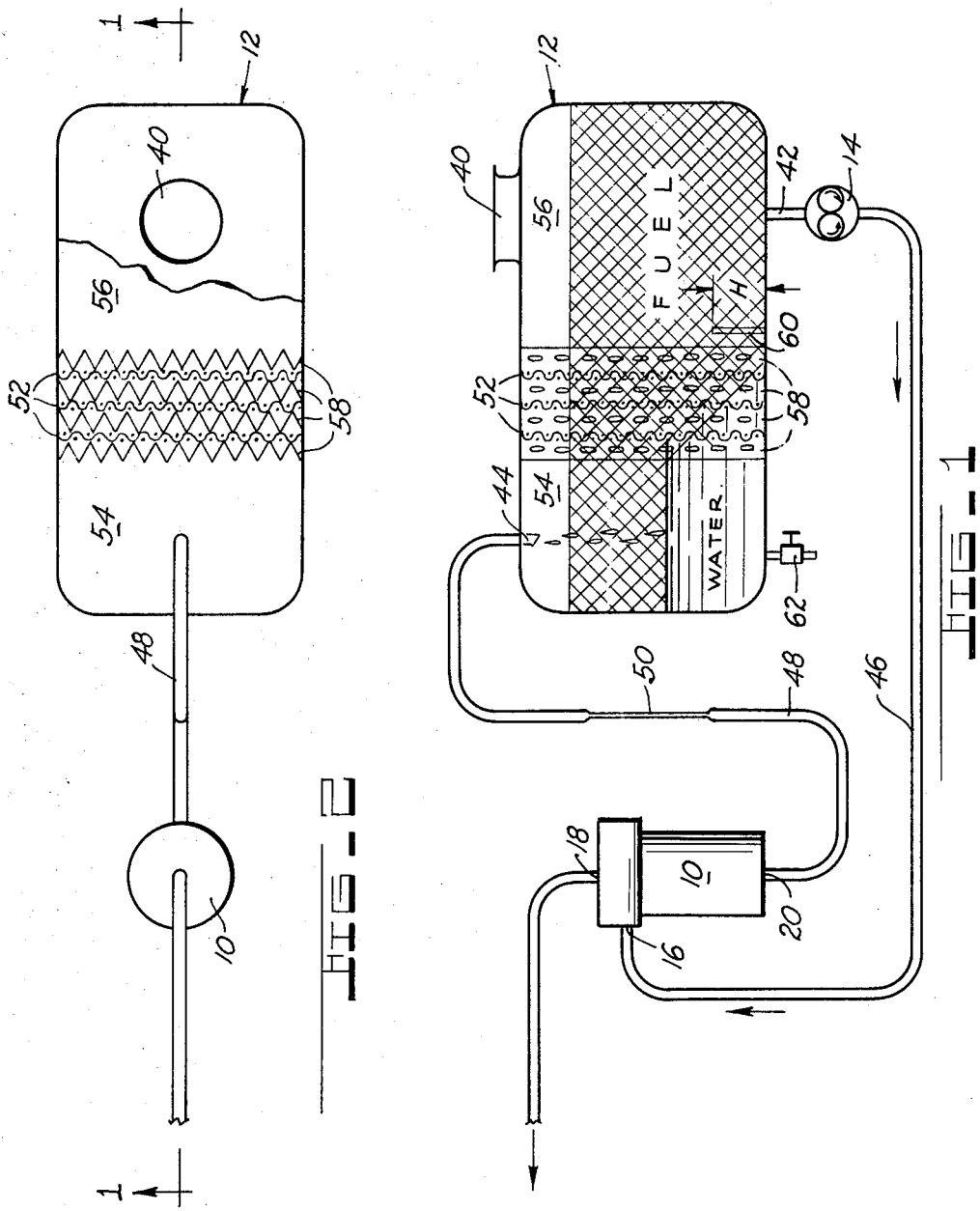
INVENTOR.
WALTER KASTEN.
BY
*William N. Antonis*
ATTORNEY.

May 3, 1966  W. KASTEN  3,249,229
FUEL STORAGE AND DISPENSING SYSTEM
Filed Oct. 23, 1963  4 Sheets-Sheet 2
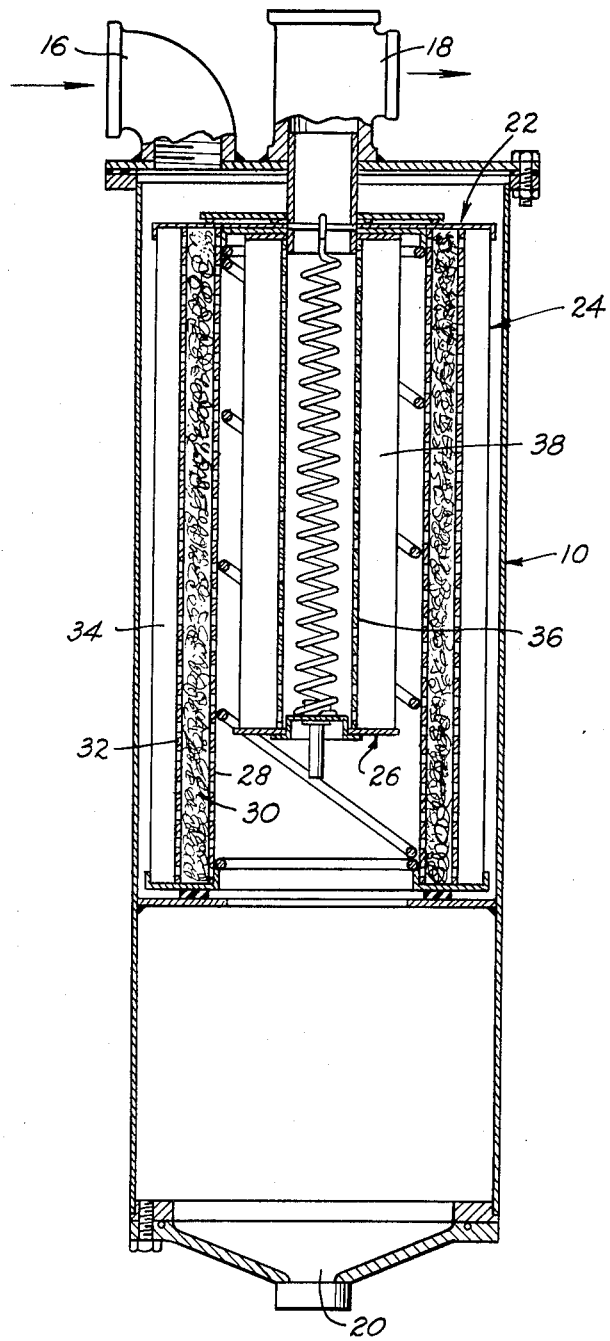
FIG_3
INVENTOR.
WALTER KASTEN
BY
William N. Antonis
ATTORNEY.

May 3, 1966 W. KASTEN 3,249,229
FUEL STORAGE AND DISPENSING SYSTEM
Filed Oct. 23, 1963 4 Sheets-Sheet 3
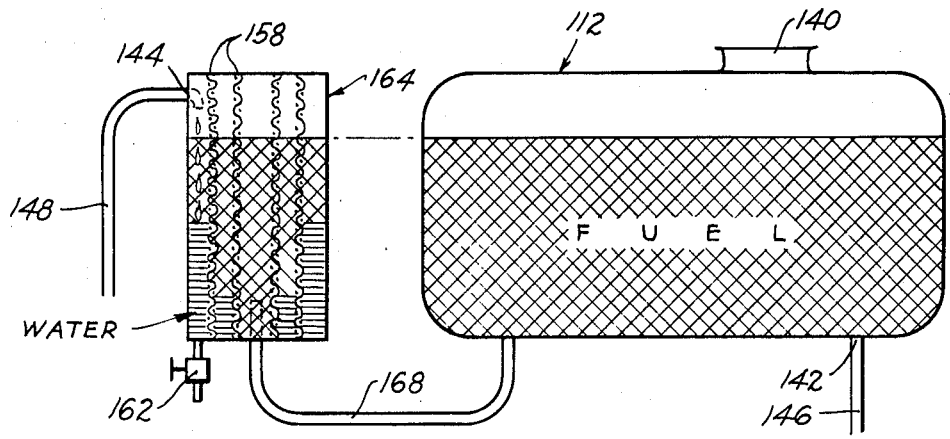
FIG_4
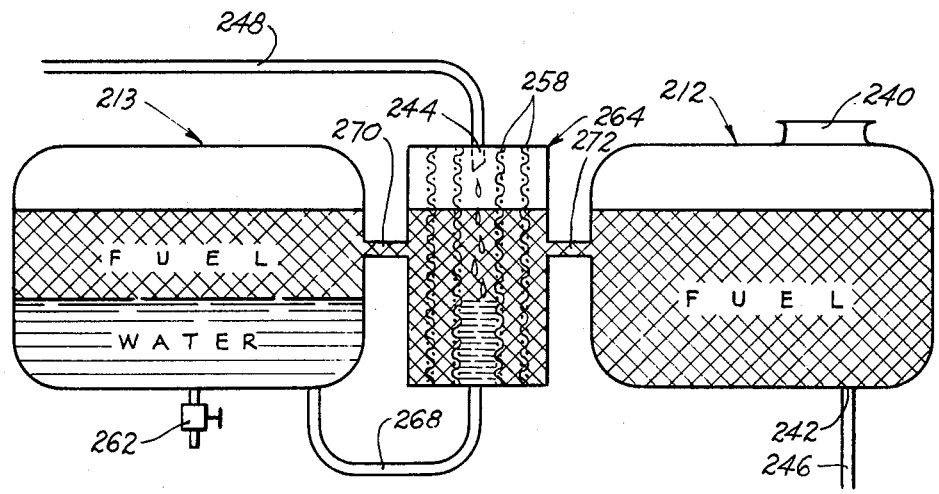
FIG_5
INVENTOR.
WALTER KASTEN.
BY
*William N. Antonis*
ATTORNEY.

May 3, 1966  W. KASTEN  3,249,229
FUEL STORAGE AND DISPENSING SYSTEM
Filed Oct. 23, 1963  4 Sheets-Sheet 4
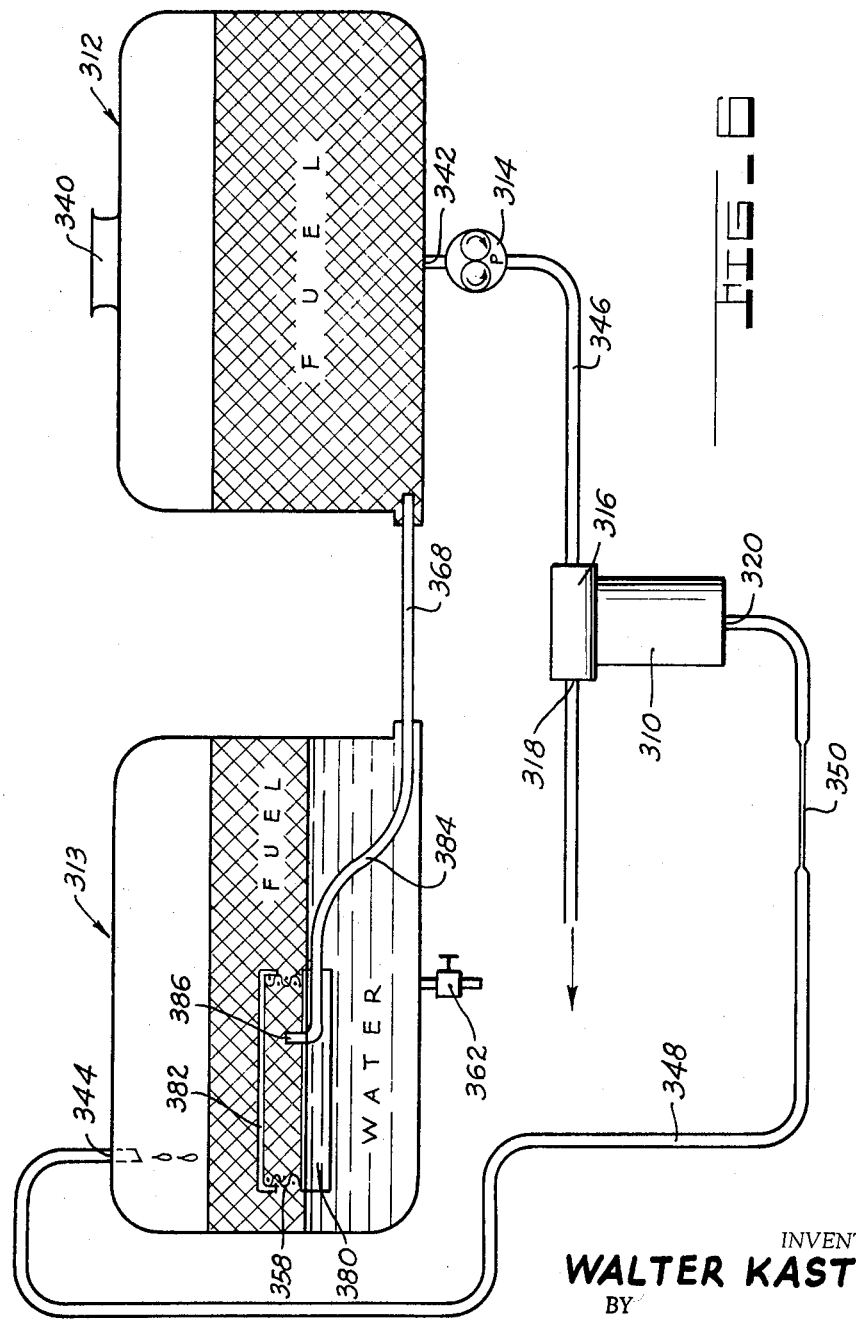
INVENTOR.
WALTER KASTEN.
BY
*William N. Antonis*
ATTORNEY.

United States Patent Office 3,249,229
Patented May 3, 1966

3,249,229
FUEL STORAGE AND DISPENSING SYSTEM
Walter Kasten, Madison Heights, Mich., assignor to The Bendix Corporation, Madison Heights, Mich., a corporation of Delaware
Filed Oct. 23, 1963, Ser. No. 318,335
18 Claims. (Cl. 210—195)

This invention relates to a fuel storage and dispensing system and more particularly to a system which utilizes the fuel tank for storing water which has been separated from the fuel being dispensed from said tank.

It is common knowledge that operators of motor vehicles which utilize internal combustion engines for power plants are faced with the problem of supplying clean water free fuel to the power plant. If multifuel or diesel power plants are used, this problem becomes considerably more critical. These latter power plants do not use carburetors, but use fuel injection pumps having close fitting pistons and small clearance between various moving parts. In such systems, fuel is forced under very high pressures through the relatively small orifices of the fuel injection nozzles into the combustion chamber. If any solid and/or water contaminants are present in the fuel, such contaminants will cause rapid wear of moving parts and abrasion of the small orifices in the fuel injection system.

Although most fuel, which is piped into fuel tanks, is relatively free of solid and/or water contaminants, it is still possible for such contamination to get into such tanks. For example, such contamination could occur during the filling of fuel tanks in dusty air or during rainy weather. In addition, water can enter fuel tanks as a result of condensation during temperature changes. Even with suitable piping precautions it has been found that up to ten percent (10%) water can accumulate in fuel tanks from the aforementioned and other occurrences.

In order to eliminate solid and water contamination from such fuel, various types of effective fuel filters and filter water separators have been developed. These devices can readily trap and separate the solid and water contaminants from the fuel and prevent these contaminants from getting into the fuel injection system. While it is relatively simple to eliminate water and solid contaminants from fuel through use of a filter water separator when only small percentages of water are encountered, it becomes a problem to dispose of such water from the filter water separator sump if large percentages of water are present. For example, a modern tank may have a fuel tank capacity of 400 gallons and, if only two percent (2%) of the capacity is water, the filter-separator would be required to trap eight (8) gallons of water. Since the total volume of fuel filters used for this purpose seldom exceeds more than a fraction of one (1) gallon and the sump capacity is rarely larger than one (1) quart, it of course is impractical to contain eight (8) gallons of water in the sump.

Various types of float mechanisms have been utilized in an effort to discharge the water periodically as it accumulates in the sump. While most of these float mechanisms operate satisfactorily in stationary locations, no practical float mechanism has ever been developed which will function satisfactorily when installed in a military vehicle which must travel in cross country operation, up and down steep slopes, and over rough terrain.

Capacitance type probes in conjunction with electrical solenoid valves have also been used in place of float type devices. However, these are very costly, require complicated electrical circuits, and are not fool-proof since the sensor probes occasionally become coated with waxes and detergents due to the "lacy" interface layer between the fuel and water levels.

Accordingly, it is an object of this invention to provide a fuel storage and dispensing system which will satisfactorily separate water from fuel and remove it from the sump of the water separator device in a simple and economical manner.

Another object of this invention is to provide a fuel storage and dispensing system wherein the fuel tank of the system is utilized for storing water which is separated from the fuel, said separated water being prevented from mixing with the remaining fuel in the tank by porous hydrophobic barriers located in the tank.

More specifically, it is an object of this invention to provide a fuel storage and dispensing system comprising a device for separating water from fuel, fuel storage tank means for supplying fuel to the device and for storing the water separated from said fuel by the device, and porous hydrophobic barrier means located in said tank means upstream of the tank discharge port which will permit flow of fuel therethrough to the discharge port of the tank means, but which will prevent flow therethrough to said discharge port of that water which was separated from the fuel by said device and returned to the fuel storage tank means, said separated water thereby being retained in said storage tank means until it is drained therefrom.

The above and other objects and features of the invention will become apparent from the following description of the system taken in connection with the accompanying drawings which form a part of this specification and in which:

FIGURE 1 is a sectional view, taken along line 1—1 of FIGURE 2, which schematically shows the novel fuel storage and dispensing system;

FIGURE 2 is a top view of the storage and dispensing system shown in FIGURE 1;

FIGURE 3 is a sectional view of a fuel filter water separator which is suitable for use in the system shown in FIGURE 1; and FIGURES 4, 5 and 6 are schematic illustrations of three additional embodiments which incorporate the concepts of the novel fuel storage and dispensing system.

Referring to FIGURES 1 and 2, it will be seen that the novel fuel storage and dispensing system includes a device 10 such as the fuel filter water separator shown in FIGURE 3, for separating water from fuel, a fuel storage tank 12, and a suitable pump 14.

The fuel filter water separator 10 has an inlet port 16, an outlet port 18, a sump port 20, and a vertical single unit two-stage filter 22 which includes a first stage demulsifier element 24 and a second stage filter element 26. The first stage demulsifier element 24 has a perforated core 28 around which is wrapped a fiberglass batt 30 which has a strong affinity for the liquid (water) to be coalesced. Wrapped around the outer layer of the fiberglass batt is an onion bag cloth 32 which is stapled thereon to form a self supporting cylinder. A pleated filtering member 34 made of resin impregnated fibrous material surrounds the fiberglass batt 30. The second stage filter element 26, located within the core 28 of the demulsifier element includes a perforated core 36 and a resin impregnated pleated member 38, or other suitable means, for preventing the coalesced water from passing therethrough. During operation of the fuel filter water separator 10, fuel will enter through inlet port 16 and will collect around the first stage demulsifier element 24. Because of the pressure drop across the unit, this fuel will be forced through the pleated filtering member 34, leaving any particles of solid matter which may be present on the outside surface thereof. As the fuel passes through the fiberglass batt 30, the tiny droplets of water dispersed in the fuel are coalesced into larger droplets that will tend to settle to the bottom of the unit (sump), since water is heavier than fuel. Because of the speed of the fuel through the unit, some of the water, although coalesced into larger drops, may be carried along with the fuel to the second stage filter element 26. These drops of water cannot pass through this filter element and therefore will collect on the outside of the pleats and subsequently drop to the bottom of the separator unit. The fuel is purified further by passing through the second stage element 26 and then leaves the separator unit 10 via outlet port 18. Additional details regarding this type of a fuel filter water separator may be found in Kasten Patent No. 2,864,505, issued December 16, 1958.

The fuel storage tank 12, which is utilized for supplying fuel to the separator device 10 and for storing the water separated from the fuel by the separator device 10, includes a fill port 40, a discharge port 42, and a return port 44. A fuel line 46 communicates the discharge port 42 of the tank with the inlet port 16 of the separator 10, while a return line 48 communicates the sump port 20 of the separator with the return port 44 of the tank. The return line is equipped with a capillary type restrictor 50 or other suitable means which will limit the flow of fluid therethrough so that only a portion of the total flow passing through the filter separator can return to the fuel tank via sump port 20. The proportion of the fluid to be returned to the fuel tank in this manner depends upon the maximum amount of water expected in the fuel. Thus, for example, if it is suspected that the fuel may contain as much as ten percent (10%) water, the restrictor would be so proportioned as to direct ninety percent (90%) of the flow through the filter separator outlet port 18 and ten percent (10%) through the filter separator sump port 20 back to the fuel tank. If there is any likelihood that the water in the filter separator sump or return line might freeze, the restrictor could be proportioned so that the percentage of the flow returned to the fuel tank via the sump port would be such that the fuel returned through the sump port would exceed the maximum water concentration suspected or encountered in the fuel.

Located within the fuel tank 10 and interposed between return port 44 and discharge port 42 are a plurality of non-contacting porous hydrophobic barriers or partitions 52 which in effect separate the fuel tank into a first chamber 54 which communicates with return port 44 and a second chamber 56 which communicates with discharge port 42. The hydrophobic partitions may be formed of fine weave Teflon coated screen or other suitable porous material which will permit flow of fuel therethrough, but which will prevent flow of water therethrough in much the same manner as the second stage element 26 of the filter water separator unit which is shown in FIGURE 3. Adjacent to each face of the hydrophobic partitions 52 is a corrugated and perforated splash baffle 58 for preventing excessive turbulence at the partitions 52.

Initially the fuel tank 12 will be filled with fuel which contains highly dispersed water. The hydrophobic barrier screens 52 will allow the fuel and also emulsified water (but not free water) to pass therethrough and fill both chambers 54 and 56 to the same level. As the fuel is pumped from the fuel tank 12 through the filter water separator 10, the water therein will be coalesced and separated therefrom, as described above. Since the water has a higher specific gravity than the fuel, the water will flow into the filter separator sump and thence through the return line 48 into chamber 54 of the tank. The coalesced (free) water which has been returned to chamber 54 of the tank from the separator unit is prevented from flowing into chamber 56 of the tank because of the hydrophobic barrier means 52 which are interposed therebetween. However, as previously stated, any fuel which is located in chamber 54 can readily flow through the hydrophobic barrier means and into chamber 56.

It will be understood that only one porous hydrophobic partition 52 is normally necessary to practice the invention. However, the use of a plurality of partitions 52 will increase the effectiveness thereof. Thus, if the water level in chamber 54 increases to a high enough level, it could possibly force some of the water through the first partition 52 and possibly to a lesser degree through the second partition 52. But, as shown in FIGURE 1, each successive partition will retain the water at a lower level, the last level of which will not be sufficiently high to force any water through the next adjacent partition. If, for some reason or other, it is felt that additional precautions are necessary, a non-porous fuel tank baffle 60 could be suitably positioned in the fuel tank to maintain a minimum height of "H" fuel or water in chamber 54. A drain valve 62 is shown for draining the water from the tank before the tank is refilled with fuel.

Other modifictaions of the disclosed system to accomplish the same purpose could be utilized, as shown, for example in FIGURES 4, 5 or 6. Referring to FIGURE 4, wherein like parts are designated by the same numerals plus 100, it will be seen that the system could include (in place of the single fuel storage tank 12 of FIGURE 1) a main fuel tank 112 having a fill port 140 and a discharge port 142 therein and a separate fuel return tank 164 having a return port 144 therein. A conduit 168 connects the return tank 164 with the main fuel tank 112. The fuel return tank could be cylindrical and have one or more substantially cylindrical hydrophobic partitions 158 of the same type which were utilized in the FIGURE 1 embodiment. If desired, cylindrical ribbon type elements with Teflon strips therebetween, as disclosed in my copending patent application Serial No. 219,685, filed August 27, 1962, now Patent No. 3,189,182, could be used instead of hydrophobic cylinders formed of materials such as Teflon coated wire screen.

Since most military tanks utilize at least two fuel tanks (a primary and secondary tank), the hydrophobic barriers could be installed in a separate fuel return tank located in the connections between the two fuel tanks, as shown in FIGURE 5, wherein like parts are designated by the same numerals plus 200. Thus, this embodiment includes a primary fuel tank 212 having a fill port 240 and a discharge port 242 therein, a secondary tank 213, and a fuel return tank 264 having a return port 244 therein. A conduit 268 connects the return tank 264 with the secondary tank 213 so that the separated water can be discharged into the secondary tank which of course could accommodate as much as a fifty percent (50%) water content. Fuel can flow from the secondary fuel tank to the primary fuel tank via conduit 270, return tank 264 and conduit 272.

FIGURE 6 shows another embodiment of the invention, wherein like or similar parts as designated by the same numerals plus 300. The system includes a device 310 for separating water from fuel which includes an inlet port 316, an outlet port 318, and a sump port 320, a primary fuel storage tank 312 having a fill port 340 and a discharge port 342, a secondary fuel storage tank 313 having a return port 344, and a suitable pump 314. A fuel line 346 communicates the discharge port 342 of the primary tank with the inlet port 316 of the separator 310, while a return line 348 communicates the sump port 320 of the separator with the return port 344 of the secondary tank 313. The return line includes a capillary type restrictor 350 for restricting flow therethrough to a predetermined portion of the total flow passing through the separator 310. A conduit 368 connects the secondary tank with the primary tank. In this arrangement a floating hydrophobic barrier is located in the secondary tank 313. This hydrophobic barrier may consist of a Teflon coated screen 358 or other suitable hydrophobic permeable media that is mounted on a disc-like carrier 380 which will float on water and sink in fuel. This disc-like carrier could be a ballasted float or it could be made of a solid material of such density as to make it float on the interface of a fuel-water mixture. The upper end of the Teflon coated screen is closed by a non-porous end cap 382. A flexible conduit 384 having an orifice 386 communicates the fuel in the secondary tank with the discharge port 342 of the primary tank via conduit 368. It will be obvious that this particular arrangement will permit the storage of a large amount of water, will permit the utilization of all of the fuel in both tanks regardless of the water content, and will eliminate the danger of water breaking through the hydrophobic barrier in the event that the fuel level is lower than the water level.

The several practical advantages which flow from my fuel storage and dispensing system are believed to be obvious from the above; and other advantages may suggest themselves to those who are familiar with the art to which this invention relates.

Furthermore, although my invention has been described in connection with certain specific embodiments, it will be obvious to those skilled in the art that various changes may be made in the form, structure, and arrangement of components without departing from the spirit of the invention. Accordingly, I do not desire to be limited to the specific embodiments disclosed herein primarily for purposes of illustration, but instead desire protection falling within the scope of the appended claims.

Having thus described the various features of the invention what I claim as new and desire to secure by Letters Patent is:

1. A fuel storage and dispensing system comprising a device for separting water from fuel, said device having an inlet port, an outlet port and a sump port, fuel storage tank means for supplying fuel to said device and for storing the water separated from said fuel by said device, said fuel tank means having a fill port, a discharge port and a return port, first passage means for communicating the discharge port of said tank means with the inlet port of said device, second passage means for communicating the sump port of said device with the return port of said tank means, means for restricting flow through said second passage means so that only a predetermined portion of the total flow passing through said device can return to said tank means, and means located in said tank means for permitting flow of fuel to the discharge port of said tank means but preventing flow to said discharge port of that water which was separated from the fuel by said device and return to said tank means via said second passage means.

2. A fuel storage and dispensing system comprising a device for separting water from fuel, said device having an inlet port, an outlet port and a sump port, fuel storage tank means for supplying fuel to said device and for storing the water separated from said fuel by said device, said fuel tank means having a fill port, a discharge port and a return port, first passage means for communicating the discharge port of said tank means with the inlet port of said device, second passage means for communicating the sump port of said device with the return port of said tank means, means for restricting flow through said second passage means so that only a predetermined portion of the total flow passing through said device can return to said tank means, and porous hydrophobic barrier means located in said tank means and interposed between said return and discharge ports of said tank means, said barrier means being characterized in that fuel is permitted to flow therethrough to said discharge port whereas the water which was separated from the fuel by said device and returned to said tank means via said second passage means is prevented from flowing therethrough to said discharge port and is thereby retained in said tank means.

3. A fuel storage and dispensing system, as defined in claim 2, wherein said means for restricting flow comprises a restricted orifice located in said second passage means.

4. A fuel storage and dispensing system, as defined in claim 2, wherein said porous hydrophobic barrier means is formed of fine wire mesh screen coated with a material having an affinity for fuel but an aversion for water.

5. A fuel storage and dispensing system, as defined in claim 4, wherein said material is Teflon.

6. A fuel storage and dispensing system, as defined in claim 2, wherein said porous hydrophobic barrier means is formed of a plurality of axially aligned convolutions of a resin impregnated ribbon material having a strip of Teflon interposed between said convolutions.

7. A fuel storage and dispensing system comprising a device for separating water from fuel, said device having an inlet port, an outlet port and a sump port, a fuel storage tank for supplying fuel to said device and for storing the water separated from said fuel by said device, said fuel tank having a fill port, a discharge port and a return port, first passage means for communicating the discharge port of said tank with the inlet port of said device, second passage means for communicating the sump port of said device with the return port of said tank, means for restricting flow through said second passage means so that only a predetermined portion of the total flow passing through said device can return to said tank, and porous hydrophobic partition means located in said tank and interposed between said return and discharge ports of said tank for separating said tank into first and second chambers, said first chamber communicating with said return port and being on the upstream side of said partition means and the second chamber communicating with said discharge port and being on the downstream side of said partition means, said porous hydrophobic partition means being characterized in that fuel located in said first chamber is permitted to flow therethrough into said second chamber whereas the water which was separated from the fuel by said device and returned to the first chamber of said tank via said second passage means is prevented from flowing therethrough to said second chamber and is thereby retained in said first chamber.

8. A fuel storage and dispensing system, as defined in claim 7, which includes porous splash baffle means located adjacent to and on the upstream side of said porous hydrophobic partition means for preventing excessive fluid turbulence at said partition means.

9. A fuel storage and dispensing system, as defined in claim 7, wherein said porous hydrophobic partition means includes a plurality of spaced non-contacting porous hydrophobic members for preventing the separated water in said first chamber from flowing into said second chamber.

10. A fuel storage and dispensing system, as defined in claim 9, which includes a porous splash baffle located on each side of each of said porous hydrophobic members for supporting same and for preventing excessive fluid turbulence at said partition means.

11. A fuel storage and dispensing system, as defined in claim 7, which includes a non-porous wall located adjacent to and downstream of said partition means for maintaining a minimum height of fuel or water in said first chamber.

12. A fuel storage and dispensing system comprising a device for separating water from fuel, said device having an inlet port, an outlet port and a sump port, fuel storage tank means for supplying fuel to said device and for storing the water separated from said fuel by said device, said tank means including a main fuel tank having a fill port and a discharge port therein and a separate fuel return tank having a return port therein, conduit means for communicating one tank with the other tank, first passage means for communicating the discharge port of said main tank with the inlet port of said device, second passage means for communicating the sump port of said device with the return port of said return tank, means for restricting flow through said second passage means so that only a predetermined portion of the total flow passing through said device can return to said return tank, and porous hydrophobic partition means located in said return tank and interposed between said return port and said conduit means, said partition means being characterized in that fuel is permitted to flow therethrough to said main tank via said conduit means whereas the water which was separated from the fuel by said device and returned to said return tank via said second passage means is prevented from flowing therethrough to said main tank and is thereby retained in said return tank.

13. A fuel storage and dispensing system, as defined in claim 12, wherein the porous hydrophobic partition means in said fuel return tank are substantially cylindrical and are disposed in said tank so that the return port will be upstream thereof and the conduit means will be downstream thereof.

14. A fuel storage and dispensing system, as defined in claim 13, wherein said partition means includes a plurality of concentric elements having hydrophobic characteristics.

15. A fuel storage and dispensing system comprising a device for separating water from fuel, said device having an inlet port, an outlet port and a sump port, fuel storage tank means for supplying fuel to said device and for storing the water separated from said fuel by said device, said tank means including a primary fuel tank having a fill port and a discharge port therein, a secondary fuel tank, and a fuel return tank having a return port therein, first conduit means for communicating said secondary fuel tank with said primary fuel tank, said fuel return tank being interposed in said first conduit means, second conduit means for communicating said fuel return tank with said secondary fuel tank, first passage means for communicating the discharge port of said primary tank with the inlet port of said device, second passage means for communicating the sump port of said device with the return port of said return tank, means for restricting flow through said second passage means so that only a predetermined portion of the total flow passing through said device can return to said return tank, and porous hydrophobic partition means located in said return tank and interposed between said return port and said first conduit means, said partition means being characterized in that fuel is permitted to flow therethrough to said primary tank via said first conduit means whereas the water which was separated from the fuel by said device and returned to said return tank via said second passage means is prevented from flowing therethrough to said primary tank and is thereby retained in said return tank and secondary tank, said partition means being disposed in said return tank so that return port and second conduit means communicate with the upstream side of said partition means and the first conduit means communicates with the downstream side thereof.

16. A fuel storage and dispensing system comprising a device for separating water from fuel, said device having an inlet port, an outlet port and a sump port, fuel storage tank means for supplying fuel to said device and for storing the water separated from said fuel by said device, said fuel tank means having a fill port, a discharge port and a return port, first passage means for communicating the discharge port of said tank means with the inlet port of said device, second passage means for communicating the sump port of said device with the return port of said tank means, means for restricting flow through said second passage means so that only a predetermined portion of the total flow passing through said device can return to said tank means, carrier means located in said tank means and constructed to float on water and sink in fuel so that said carrier means will always be located substantially at the interface of a fuel-water mixture, flexible conduit means having orifice means therein for communicating fuel in said tank means to said discharge port via said orifice means, said conduit means being operatively connected to said floating carrier means so that said orifice means is continuously positioned in said fuel just above any water located in said tank means, and porous hydrophobic barrier means carried by said carrier means and interposed between said return port and said orifice means, said barrier means being characterized in that fuel is permitted to flow therethrough to said discharge port via said flexible conduit means whereas the water which was separated from the fuel by said device and returned to said tank means via said second passage means is prevented from flowing therethrough to said discharge port and is thereby retained in said tank means.

17. A fuel storage and dispensing system, as defined in claim 16, wherein said porous hydrophobic barrier means includes at least one substantially cylindrical porous element having hydrophobic characteristics for surrounding said orifice means, said element being carried by said carrier means and having the upper end thereof closed by a non-porous end cap.

18. A fuel storage and dispensing system comprising a device for separating water from fuel, said device having an inlet port, an outlet port and a sump port, fuel storage tank means for supplying fuel to said device and for storing the water separated from said fuel by said device, said tank means including a primary fuel tank having a fill port and a discharge port therein and a secondary fuel tank having a return port therein, first passage means for communicating the discharge port of said primary tank with the inlet port of said device, second passage means for communicating the sump port of said device with the return port of said secondary tank, means for restricting flow through said second passage means so that only a predetermined portion of the total flow passing through said device can return to said secondary tank, carrier means located in said secondary tank and constructed to float on water and sink in fuel so that said carrier means will always be located substantially at the interface of a fuel-water mixture, flexible conduit means having an orifice therein for communicating fuel in said secondary tank with said primary tank via said orifice, said flexible conduit means being operatively connected to said floating carrier means so that said orifice is continuously positioned in the remaining fuel just above any water being stored in said secondary tank, and porous hydrophobic barrier means carried by said carrier means and interposed between said return port and the orifice of said flexible conduit means, said barrier means being characterized in that fuel from said secondary tank is permitted to flow therethrough to said primary tank via said flexible conduit means whereas the water which was separated from the fuel by said device and returned to said secondary tank via said second passage means is prevented from flowing therethrough to said primary tank and is thereby retained in said secondary tank.

References Cited by the Examiner
UNITED STATES PATENTS

| | | |
|---|---|---|
| 1,107,485 | 8/1914 | Bowser. |
| 1,661,284 | 3/1928 | Fuqua et al. |
| 2,763,372 | 9/1956 | Dudchick. |
| 2,788,125 | 4/1957 | Webb. |
| 2,864,505 | 12/1958 | Kasten. |

REUBEN FRIEDMAN, *Primary Examiner.*

D. M. RIESS, *Assistant Examiner.*